: US 8,405,898 B2
(45) Date of Patent: Mar. 26, 2013

(12) United States Patent
Olaya

(54) DEVICE FOR CORRECTING THE WAVELENGTH DEPENDENCE IN DIFFRACTION-BASED OPTICAL SYSTEMS

(75) Inventor: Jean-Christophe Olaya, Berlin (DE)

(73) Assignee: Seereal Technologies S.A., Munsbach (LU)

( * ) Notice: Subject to any disclaimer, the term of this patent is extended or adjusted under 35 U.S.C. 154(b) by 371 days.

(21) Appl. No.: 12/529,558

(22) PCT Filed: Feb. 29, 2008

(86) PCT No.: PCT/EP2008/052501
§ 371 (c)(1), (2), (4) Date: Jan. 7, 2010

(87) PCT Pub. No.: WO2008/107391
PCT Pub. Date: Sep. 12, 2008

(65) Prior Publication Data
US 2010/0149619 A1    Jun. 17, 2010

(30) Foreign Application Priority Data
Mar. 2, 2007  (DE) .................... 10 2007 011 561

(51) Int. Cl.
*G02F 1/11* (2006.01)
(52) U.S. Cl. ........................... 359/285; 359/15
(58) Field of Classification Search .............. 359/285
See application file for complete search history.

(56) References Cited

U.S. PATENT DOCUMENTS
2006/0033972 A1*  2/2006  Takemori et al. ............. 359/32
2008/0218699 A1*  9/2008  Lapchuk et al. ............. 353/31

FOREIGN PATENT DOCUMENTS
DE    10 2005 023 743    11/2006
WO    WO 2004/031841    4/2004
WO    WO 2007/141567    12/2007

OTHER PUBLICATIONS

International Search Report, dated Jun. 25, 2008, issued in priority International Application No. PCT/EP2008/052501 (in both German and English).
Takano, K. et al., "Color electro-holographic display using a single white light and a focal adjustment method," Optical Engineering, Soc. of Photo-Optical Instrumentation Engineers. Bellingham, vol. 41, No. 10 (Oct. 1 2002), pp. 2427-2433. XP000962420.
Mutter, E., "Kompendium der Photographie," vol. I, Verlag fur Radio-Foto-Kinotechnik GmbH, Berlin-Borsigwalde, pp. 270-271 (1958).

* cited by examiner

*Primary Examiner* — James Jones
(74) *Attorney, Agent, or Firm* — Saul Ewing LLP

(57) ABSTRACT

A device for correcting the wavelength dependence in diffraction-based optical systems in which certain orders of diffraction are filtered is disclosed, comprising at least one diffractive optical spatial light modulator that has controllable structures, and at least one light source for illuminating the spatial light modulator. Associated orders of diffraction are created which, depending on the wavelength, have a lateral chromatic offset relative to the position of the different extensions thereof on a filter plane defined by the focal length of a downstream optically focusing system, the lateral chromatic offset being in relation to the normal line to the surface of the spatial light modulator. The equinumerous orders of diffraction of different wavelengths overlap to an sufficient extent on a predefined filter plane in relation to both the direction and the extension thereof.

16 Claims, 5 Drawing Sheets

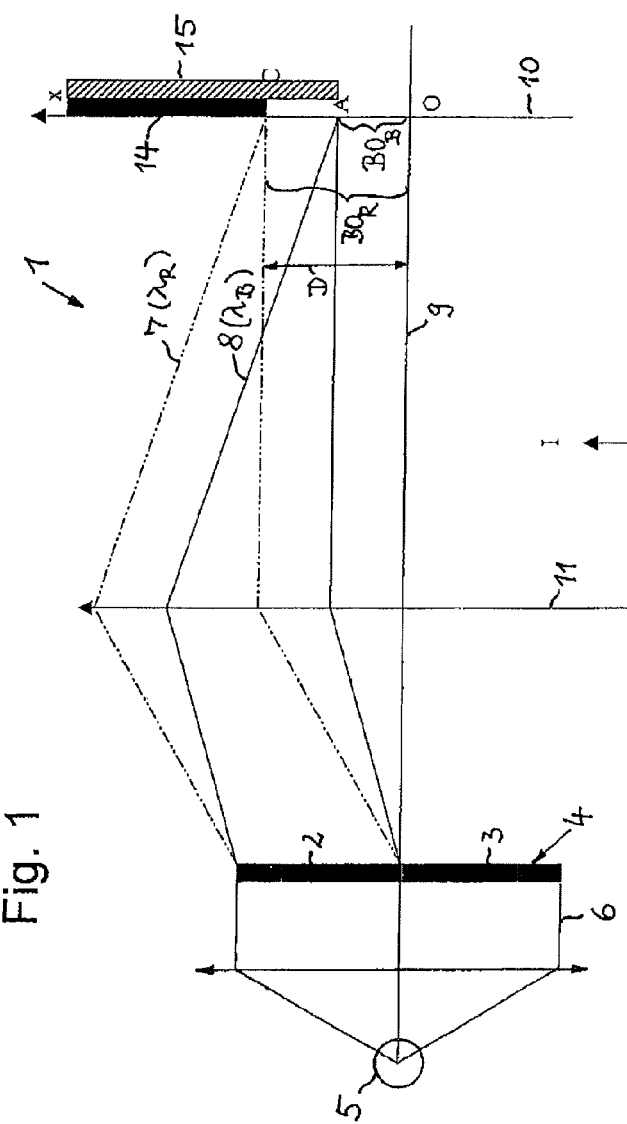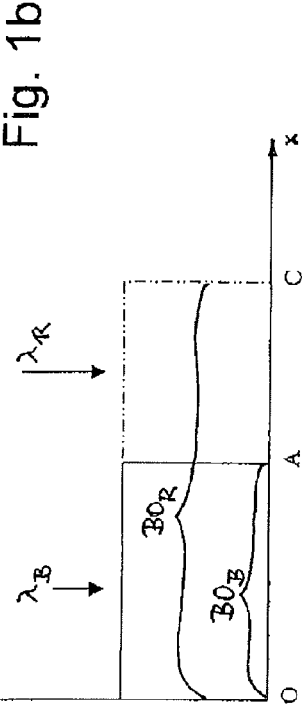

Fig. 4
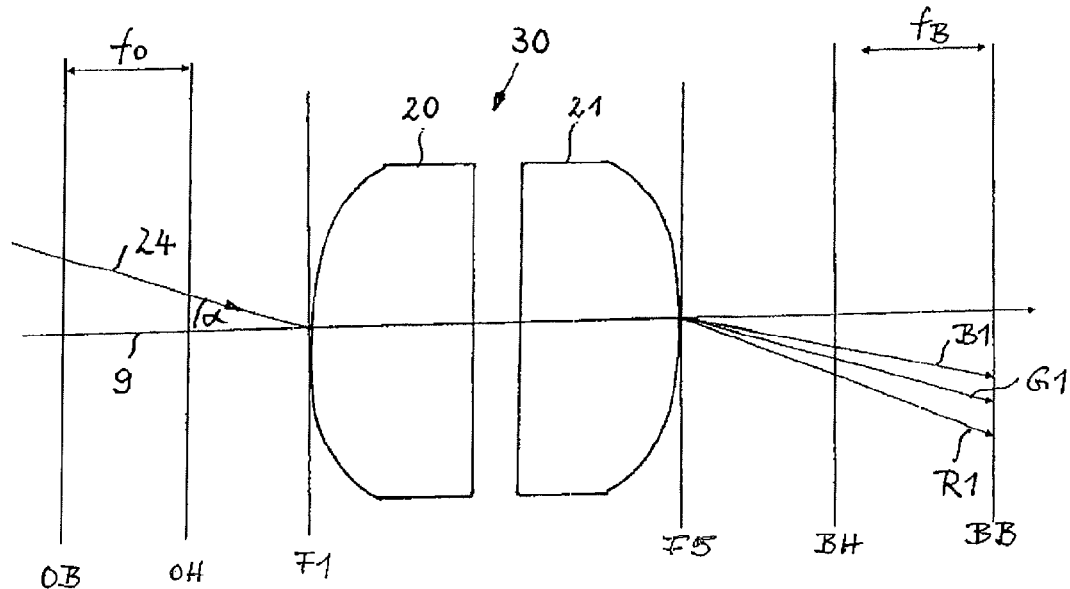
Fig. 4a
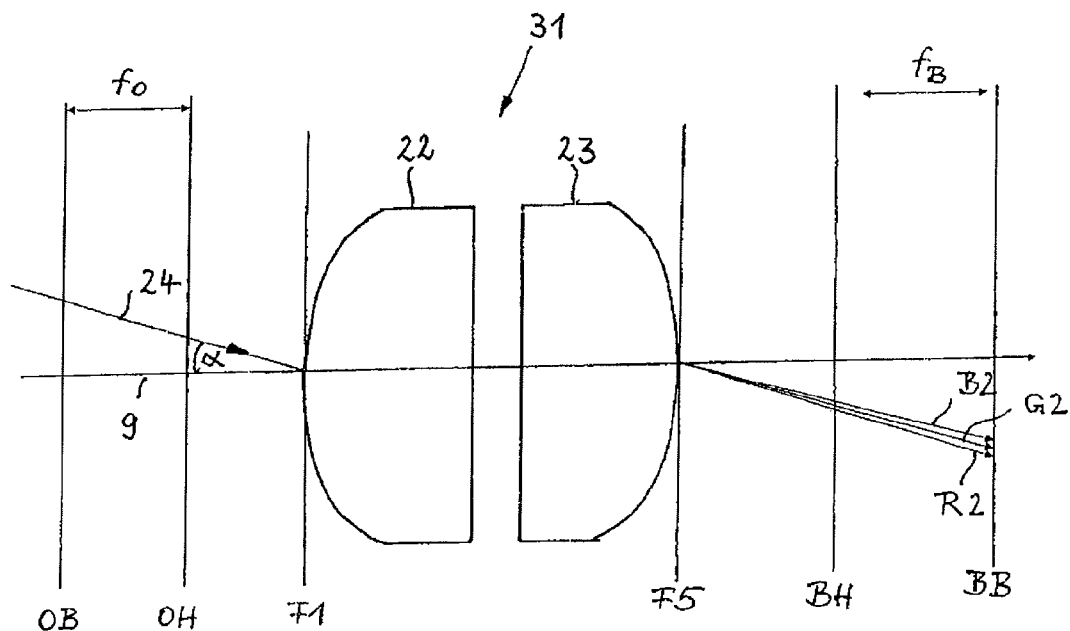
Fig. 4b

Fig. 5
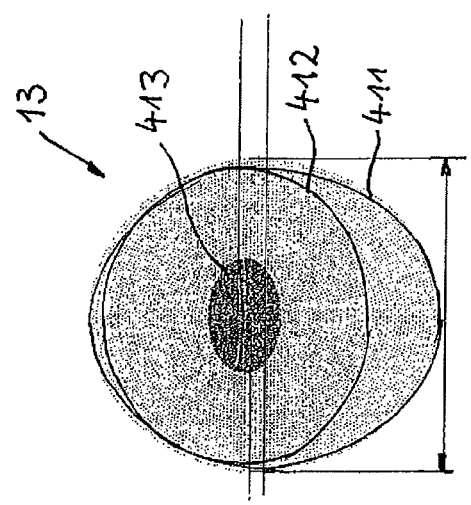
Fig. 5b
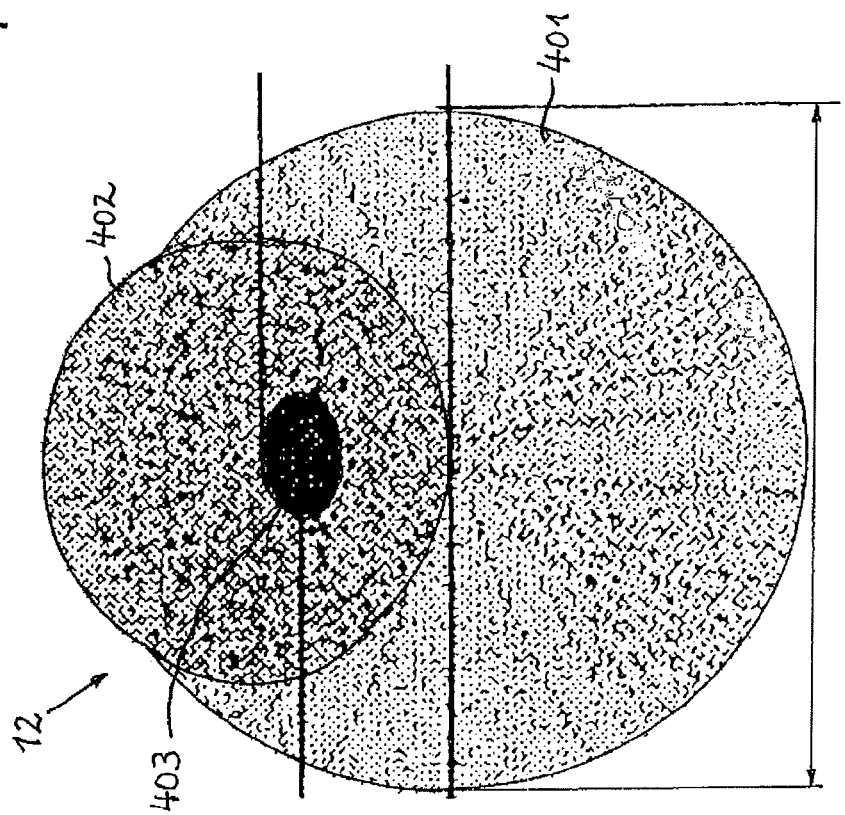
Fig. 5a

DEVICE FOR CORRECTING THE WAVELENGTH DEPENDENCE IN DIFFRACTION-BASED OPTICAL SYSTEMS

CROSS REFERENCE TO RELATED APPLICATIONS

This application claims the priority of PCT/EP2008/052501, filed on Feb. 29, 2008, which claims priority to German Application No. 10 2007 011 561.1, filed Mar. 2, 2007, the entire contents of which are hereby incorporated in total by reference.

BACKGROUND OF THE INVENTION

The invention relates to a device for correcting the wavelength dependence in diffraction-based optical systems in which a filtering of certain diffraction orders is provided, said device comprising at least one diffractive optical light modulator having controllable structures and at least one light source for illuminating the light modulator, where corresponding diffraction orders are generated which exhibit a wavelength-dependent lateral chromatic offset D, related to the surface normal of the light modulator, of the position of their different extents $BO_R$, $BO_G$, $BO_B$ in a filtering plane which is defined by the focal length of a subsequent optical system. The invention relates to both amplitude-modulating and phase-modulating light modulators and does not depend on the technological basis of the modulators. It can be realised with liquid crystal modulators as well as with modulators which are based on micro electro-mechanical systems (MEMS), acousto-optic or other modulators.

Spatial light modulators (SLM), for example realised on the basis of liquid crystals, are areal optical elements which reflect or transmit visible light and whose optical properties can be temporarily modified by applying an electric field. The electric field can be controlled discretely for small structures, also referred to as pixels, which allows the optical transparency properties of the light modulator to be modified pixel-wise but finely enough for many applications. Advantage is taken of this possibility for example in order to modify by way of amplitude or phase modulation an incident wave front during its passage though the light modulator such that, at the observer's distance, it resembles a wave front which is emitted by a real object. If the light modulator is controlled accordingly, for example a holographic reconstruction of a spatial object becomes possible without the need for this object to be actually present at the time of its observation.

Due to the discrete pixel structure of the light modulators, the diffraction pattern is repeated periodically in consecutive diffraction orders, while its intensity decreases as the ordinal number rises. It is therefore necessary for example when holographically reconstructing objects to filter a certain diffraction order—usually the first one—out of the periodic diffraction spectrum and to suppress the other diffraction orders. One problem therein is that the diffraction orders exhibit different orientations and angular extents for different wavelengths, which causes a lateral offset and a different width of the diffraction patterns in a defined filtering plane. This is why during mechanical filtering, e.g. with the help of an aperture with a defined diameter, there may be a loss of information and/or parasitic cross-talking in a certain position, in particular when reconstructing colour objects.

Document DE 10 2005 023 743 describes a method for filtering diffraction orders, where with the help of a given aperture in a particular plane—the filtering plane—irrelevant information is cut off.

In document US 2006033972 A1, that problem is solved by disposing the light sources of the different colours, $LQ_R$, $LQ_G$, $LQ_B$, which illuminate the light modulator, at such mutual distances that the diffraction orders for the three colours overlap at the same position after diffraction at the structures of the light modulator. However, this is not possible if the individual colours originate in the same light source, i.e. if a white light source is used, or if the light sources of the different colours are disposed at fixed mutual distances, e.g. as is the case when using a colour display panel as a light source.

Summarising, light modulators are diffractive optical elements whose chromatic dispersion is caused by the wavelength dependence of the diffraction angle, which cannot be avoided. In addition to diffractive optical elements (DOE), there are also refractive optical elements (ROE), where also in refractive optical elements a chromatic dispersion occurs, which means that the refraction angle varies as the wavelength of the incident light changes. Refractive dispersion is caused by the dependence of the refractive index on the wavelength.

The refractive dispersion of a lens is described for example by E. Mutter in the document "Kompendium der Photographie", vol. I, Verlag für Radio-Foto-Kinotechnik GmbH, Berlin-Borsigwalde, 1958, pp. 270-271, where each lens functions like a double prism, and the rays of shorter wavelength, i.e. the blue rays, intersect closer to the lens than the rays of longer wavelength, i.e. the red rays, due to the stronger refraction of the former. This is why there is a number of focal points one behind another in a row for the different spectral rays. In contrast to the asymmetry of a prism, a lens is a symmetrical optical element.

Instead of sharp image points, the chromatic refraction causes coloured circles of dispersion to appear around the image points so as to give them a certain kind of blur. The refraction of a lens made of glass showing a certain chromatic dispersion can be limited with the help of the refraction of another lens made of glass showing a different chromatic dispersion. A thus corrected lens, which comprises a low-refraction and high-dispersion focussing lens made of crown glass and a high-refraction and low-dispersion diverging lens made of flint glass, is also referred to as an achromatic lens. The achromatic lens unites two colours of the spectrum, namely the Fraunhofer lines C and F. For higher-quality photographic recordings, a correction of the refraction is performed by uniting three wavelengths.

The chromatic dispersion of a refractive optical system can be specified by its Abbe number V:

$$V=(n_d-1)/(n_F-n_C) \quad (I)$$

where $n_d$ is the refractive index of the glass material at the wavelength of neutral helium at 587.6 nm (yellow), and $n_F$ and $n_C$ are the refractive indices at the wavelengths of neutral hydrogen at 656.3 nm (red) and 486.1 nm (blue). The larger the Abbe number V, the greater the dispersion of the glass material.

The extents and the main directions of the diffraction orders are proportional to the wavelength in the filtering plane, which typically forms the focal plane of the optical system. Therein, a mechanical filter in the form of an aperture mask where e.g. the given diffraction order of the blue wavelength is considered only, which is suitable for the blue light, will cut off part of the red information of the given diffraction order of the red wavelength. There is thus neither a suitable width nor a suitable position of the aperture in the filtering plane.

This way the filtering can cause a great loss of information of a certain colour, in this example the red colour, or an inadequate filtering which does not contain all appropriate information of another colour, while parasitic light is let past, which is known as cross-talking.

One problem is that the diffraction orders have a spatial extent and an orientation which is extremely dependent on the wavelength, so that they exhibit only small overlapping sections, so that they cause a noticeably perceivable loss of information e.g. when holographically visualising objects.

It is therefore the object of the present invention to provide a device for correcting the wavelength dependence in diffraction-based optical systems, said device being designed such that the diffraction orders of the same ordinal number of light of different wavelengths, which is diffracted in the light modulator, overlap sufficiently both as regards their direction and their extent in a given filtering plane.

The object is solved with the help of the features of claim No. 1.

The device for correcting the wavelength dependence in diffraction-based optical systems, in which a filtering of certain diffraction orders is provided, said device comprising at least one diffractive optical light modulator having controllable structures and at least one light source for illuminating the light modulator, where corresponding diffraction orders are generated which exhibit a wavelength-dependent lateral chromatic offset D, related to the surface normal of the light modulator, of the position of their different extents $BO_R$, $BO_G$, $BO_B$ in a filtering plane which is defined by the focal length of a subsequent focussing optical system where according to the characterising clause of claim No. 1 the diffractive light modulator is followed by the refractive focussing optical system whose chromatic properties regarding the wavelength-dependent diffraction orders of the same ordinal number are adapted to the chromatic diffraction of the same diffraction orders of the same ordinal number of the light modulator, where in a given filtering plane after the focussing optical system the diffraction orders ($BO_R$, $BO_G$, $BO_B$) of the same ordinal number and of different wavelengths (red, green, blue) overlap as concentrically as possible.

The amount of the refractive dispersion of the focussing optical system can be identical to the amount of the diffractive dispersion of the light modulator, where refractive dispersion and diffractive dispersion act in opposing directions and compensate each other substantially.

In the filtering plane there can be disposed a filtering aperture which only lets pass selected diffraction orders of the same ordinal number and of different wavelengths (red, green, blue).

The focussing optical system can comprise multiple components, preferably at least two lenses.

In at least one lens of the focussing optical system, the refractive indices for the wavelengths of red, green and blue depend on the Abbe number V according to the equation $$V = (n_d - 1)/(n_F - n_C) \quad (I)$$

and the diffraction patterns of the wavelengths of red, green and blue of the selected diffraction orders of the same ordinal number are minimised as regards the refractive index $n_d$ of the yellow wavelength at a distance d to the filtering plane.

The lenses can form a doublet lens, where one lens exhibits a given Abbe number V1 and the other lens exhibits an Abbe number V2 which is adapted to the Abbe number V1 of the former lens.

The doublet lens can be a doublet lens with like geometric parameters, where the doublet lens can for example comprise two plano-convex lenses which are disposed such that their plane faces are parallel and facing each other.

The refractive indices $n_d$, $n_F$, $n_C$ of the Abbe number V2 of the second lens of the doublet lens can be determined based on a given value of the Abbe number V for the largely concentric overlapping of the diffraction patterns of the corresponding wavelengths of red, green and blue in the focal plane for the yellow wavelength.

It is of major importance that the remaining parameters of the focussing optical system, such as the reference focal lengths and main planes, do not change.

It can be possible to select the glass material or the glass materials of the given component—preferably the second lens—of the focussing optical system based on the given and determined Abbe numbers V and the corresponding refractive indices $n_d$, $n_F$, $n_C$.

The light source can be a single white light source, which contains the three wavelengths of red, green and blue.

The light source can alternatively be a light source unit with the light sources of the individual colours $LQ_R$, $LQ_G$, $LQ_B$ with the wavelengths of blue, green, red, which are optionally disposed at the same position or at various positions in a plane which is preferably arranged at a right angle to the surface normal.

The light modulator can have an optically active layer, preferably in the form of a plane birefringent layer, which contains liquid crystals, and whose refractive index ellipsoid is controllable by applying an electric field to the structures in the form of pixels.

The light modulator can also comprise controllable electromechanical structures—MEMS—with diffractive optical properties or be realised based on other technologies, e.g. acousto-optic.

SUMMARY OF THE INVENTION

The invention allows a focussing optical system to be formed which widely compensates the wavelength-dependent diffraction patterns of the light modulator in the filtering plane and, at the same time, generates in conjunction with the light modulator an achromaticity which largely reduces exactly the wavelength-dependent deviation of the diffraction patterns as regards their position and extent in the filtering plane.

It is thus possible to overlap the diffraction orders of the same ordinal number at least for the three wavelengths of red, green and blue, and to achieve a common mechanical filtering of all selected wavelengths without suffering from significant loss of information or filtering efficiency. It is thus relatively easy to calculate and to manufacture a chromatic focussing optical system where the chromatisation is largely determined in dependence on the glass material of the focussing optical system.

The essence of this invention is to sufficiently overlap given diffraction orders of the same ordinal number of different wavelengths of a light modulator by adapting the glass-material-dependent refractive dispersion in the subsequent focussing optical system which follows the light modulator to the diffractive dispersion of the light modulator.

This invention opens up the possibility that an improved and simplified filtering of wavelength-dependent diffraction orders of the same ordinal number is thus achieved and that the amount of possible information is maintained after the common overlapping and filtering of the diffraction orders, compared with the originally existing information.

The compensation of the wavelength dependence of transmissive diffractive light modulators can be applied analogously to reflective diffractive light modulators.

BRIEF DESCRIPTION OF THE DRAWINGS

The present invention is described in more detail below with the help of a number of embodiments and drawings, wherein FIG. 1 is a schematic diagram that shows an inventive device for correcting the wavelength dependence in diffraction-based optical systems with an achromatic focussing optical system, where FIG. 1a shows the optical paths of the two diffraction orders for the blue wavelength and for the red wavelength, and FIG. 1b shows the intensities I=I(x) in the x direction, which are let past by the two filters 14, 15.

FIG. 4 is a schematic diagram which shows a refractive focussing optical system with different chromatic properties, while other parameters remain the same, where FIG. 4a comprises an optical component with an Abbe number V of 5, and FIG. 4b comprises an optical component with an Abbe number V of 36.6.

FIG. 5 shows light spot diagrams of the focussing optical systems according to FIG. 4 with different chromatic properties at extra-axial imaging with collimated illumination for different wavelengths, where FIG. 5a shows the light spot diagrams when using a component with an Abbe number V of 5, according to FIG. 4a, and FIG. 5b shows the light spot diagrams when using a component with an Abbe number V of 36.6, according to FIG. 4b.

DETAILED DESCRIPTION

Figure 2:
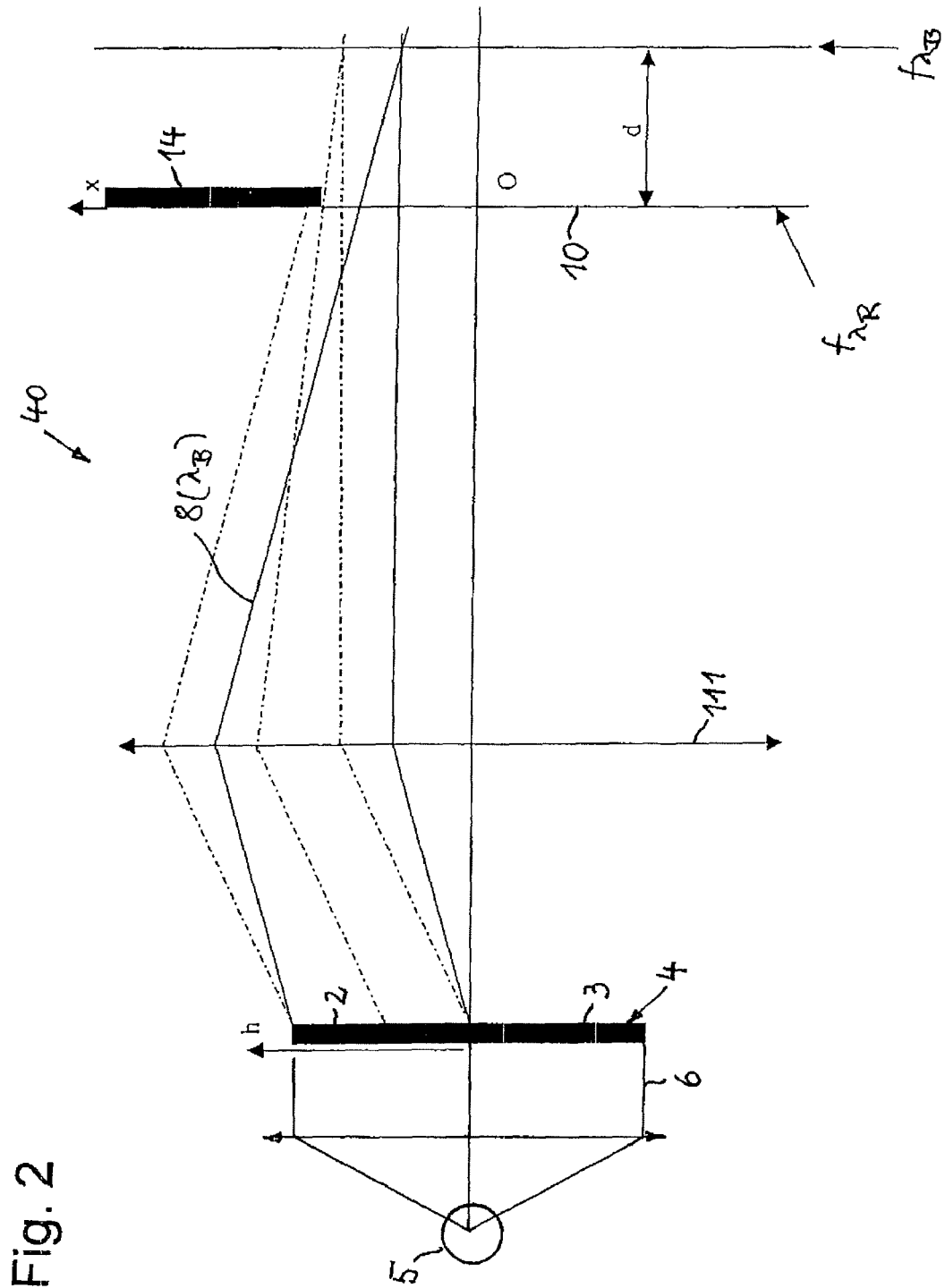
FIG. 2 is a schematic diagram that shows a device for correcting the wavelength dependence in diffraction-based optical systems with a first chromatic focussing optical system.

FIG. 1, 1a shows a schematic diagram of a device 1 for correcting the wavelength dependence in diffraction-based optical systems in which a filtering of certain diffraction orders is provided, said device comprising a light modulator 4 in the form of a diffractive optical element with controllable structures 2, 3, and at least one light source 5 for illuminating the light modulator 4, where corresponding wavelength-dependent diffraction orders 7, 8 related to an illuminating pencil of rays 6 are created which exhibit a lateral chromatic offset D, related to the surface normal 9 of the light modulator 4, as regards the position of their extents $BO_R$, $BO_B$ for the wavelengths of red and blue in a filtering plane 10 which is defined by the focal length of a focussing optical system 11 which follows the light modulator 4.

According to this invention, the diffractive light modulator 4 is combined with the refractive optical system 11 whose refractive dispersion is adapted to the diffractive dispersion of the light modulator 4 in the area of the given diffraction orders 7, 8 of the same ordinal number but acting in the opposite direction, where the diffraction orders 7, 8 of the same ordinal number of the different wavelengths of red, blue overlap concentrically in the filtering plane 10.

Referring to FIG. 1a, the filtering plane 10 is the common focal plane of the red and blue pencils of rays of the same, preferably of the first, diffraction order with the focal lengths $f_{\lambda R}=f_{\lambda B}$ when using the achromatic focussing optical system. FIG. 1b is an intensity (I) diagram which shows the intensities $I_{\lambda R}(x)$ and $I_{\lambda B}(x)$ which are let pass by the corresponding filters 14, 15 in the filtering plane 10. In addition to the desired diffraction order for a certain wavelength, a great portion of parasitic light of higher diffraction orders is generated if the aperture is chosen to be too large. However, if the aperture is chosen to be too small, parts of the desired light of the diffraction orders of the same ordinal number of other wavelengths will be cut off.

FIG. 2 is a schematic diagram that shows a device 40 for correcting the wavelength dependence in diffraction-based optical systems according to FIG. 1 with a first chromatic focussing optical system 111 instead of the achromatic focussing optical system 11.

Figure 3:
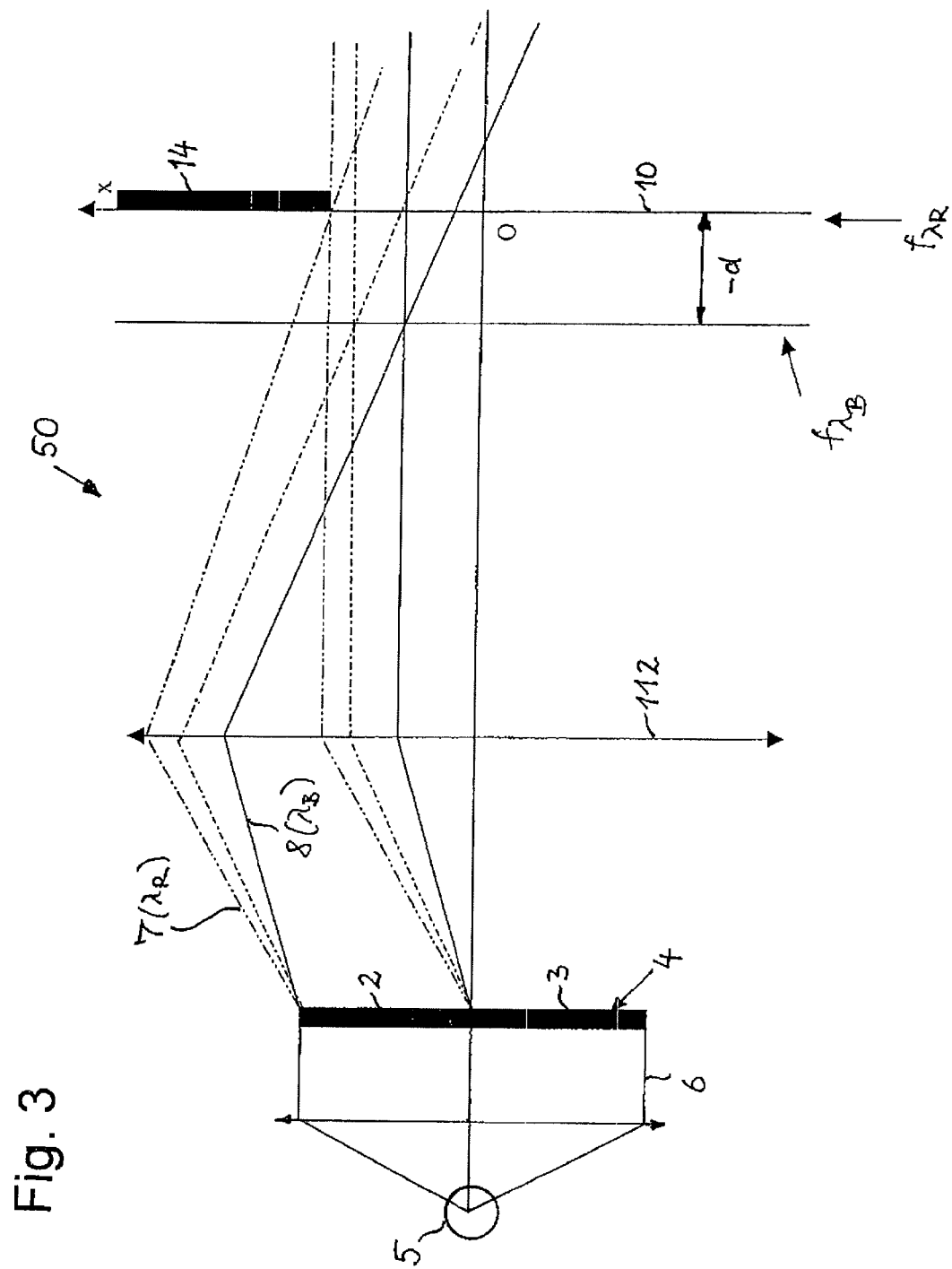
FIG. 3 is a schematic diagram that shows a device for correcting the wavelength dependence in diffraction-based optical systems with a second chromatic focussing optical system.

FIG. 3 is a schematic diagram that shows a device 50 for correcting the wavelength dependence in diffraction-based optical systems according to FIG. 1 with a second chromatic focussing optical system 112 instead of the achromatic focussing optical system 11.

FIGS. 2, 3 illustrate the possible results of the filtering step when using the focussing optical systems 111, 112 with different chromatic aberration.

FIG. 2 and FIG. 3 show respective chromatic focussing optical systems 111 and 112, which are dimensioned such that their focal lengths $f_{\lambda B}$ for the blue wavelength and $f_{\lambda R}$ for the red wavelength are separated by the distance d or −d related to the filtering plane 10, where the filtering plane 10 is situated in the focal plane $f_{\lambda R}$ of the red wavelength $\lambda_R$. In contrast, FIG. 1 shows in an achromatic optical focussing system 11, and the filtering plane 10, which is an identical plane for the focal lengths $f_{\lambda B}$ for the blue wavelength and $f_{\lambda R}$ for the red wavelength.

In FIG. 2, the chromaticity of the focussing optical system 111 in the device 40 is chosen such that the focal plane $f_{\lambda B}$ for a certain order of the blue wavelength $\lambda_B$ is situated at the distance d behind the focal plane $f_{\lambda R}$ for the red wavelength $\lambda_R$, in which also the filter 14 for the red wavelength λR is disposed. Said filter then lets pass the desired order of the blue wavelength $\lambda_B$ and red wavelength $\lambda_R$, but blocks a part of the higher order of the blue wavelength $\lambda_B$.

In FIG. 3, the chromaticity of the focussing optical system 112 in the device 50 is chosen such that the focal plane $f_{\lambda B}$ for a certain order of the blue wavelength $\lambda_B$ is situated at the distance −d in front of the focal plane $f_{\lambda R}$ for the red wavelength $\lambda_R$, in which again the filter for the red wavelength $\lambda_R$ is disposed. In addition to the desired order of the blue wavelength $\lambda_B$, said filter then completely lets pass a higher order of the blue wavelength $\lambda_B$. A substantial portion of stray coloured light is generated in this configuration, while the portion of light is reduced in the configuration according to FIG. 2.

Whether a light beam is let past or blocked depends in a given configuration on the height h of the initial point on the light modulator and on the diffraction angle $\alpha_R$, $\alpha_B$ (FIG. 2).

In order to reduce the portion of stray coloured light, the refractive focussing optical system 11 is designed such that it effects a chromatic correction which is adapted to the light modulator 4.

The chromatic focussing optical systems 111 and 112 of the device 40, 50 for correcting the wavelength dependence in diffraction-based optical systems 4 can be illustrated schematically with the help of a doublet lens system 20, 21 or 22, 23, as shown in FIG. 4.

Thanks to the chromaticity of the focussing optical systems 111, 112 which is oriented to oppose the existing chromaticity of the light modulator 4, a substantial compensation, i.e. a substantial achromatisation, is achieved as regards the wavelength dependence of the device 1.

In FIGS. 4, 4a and 4b, two focussing optical systems 30, 31, which are equivalent to the focussing optical system 11, are shown schematically in the form of doublet lenses 20, 21 and 22, 23, where the corresponding object-side focal length $f_O$ with the object-side focal plane OB and the corresponding image-side focal length $f_B$ with the image-side focal plane BB and the image-side main plane BH for a certain wavelength are shown.

The following explanation is given:

1. The incident white light beam 24 is defined by the height h in the light modulator 4, as shown in FIG. 2, and the angle of incidence α for the given focussing optical system 11, 30, 31.
2. The given focussing optical system 11, 30, 31 is defined by
    a reference wavelength $\lambda_0$, which defines the size and position of the filter 14, as shown in FIGS. 1 to 3,
    the reference focal length $f_{\lambda 0}$ of the focussing optical system 11, 30, 31 for the reference wavelength $\lambda_0$,
    the Abbe number V1 and V2 of each lens, related to the chromatic aberration of the focussing optical system 11, 30, 31, calculated for the yellow-blue-red-normalisation with $$V=(n_d-1)/(n_F-n_C) \quad (I)$$

3. The quality of the correction of the wavelength dependence of the device 1 can be described by the ratio of the light intensity which is let pass by the filter for the reference wavelength $\lambda_0$ and the light intensity in the desired diffraction order, where according to FIGS. 1a and 1b $$I_{wavelength2} = \int_0^C I_{pupil\ for\ wavelength1}(x)dx \quad (II)$$

is the intensity after the filter for the reference wavelength $\lambda_0$, and $$I_{0,wavelength2} = \int_0^A I_{pupil\ for\ wavelength2}(x)dx \quad (III)$$

is the intensity for the desired diffraction order, so that the intensity ratio K can be expressed as follows:

$$K = \frac{\int_0^C I_{pupil\ for\ wavelength1}(x)dx}{\int_0^A I_{pupil\ for\ wavelength2}(x)d} = \frac{I_{wavelength2}}{I_{0wavelength2}} \quad (IV)$$

Based on the above discussion, the intensity $I_{W2}$ is a parametric function of the Abbe number V2 of the second component of the focussing optical system. When calculating this function, the following constants are used which define the device 1 for correcting the wavelength dependence in diffraction-based optical systems:

h as the height of the light beam in the light modulator 4,
p as the pitch of the light modulator 4, where a pitch is the distance between the centres of adjacent pixels,
$f_{\lambda 0}$ as the reference focal length for the reference wavelength $\lambda_0$,
$\lambda_0$ as the system reference wavelength of the focussing optical system 11, 30, 31, which defines the size and position of the filter 14 in the image-side focal plane BB with the focal length $f_{\lambda 0}$.

Because it is the aim to dimension the focussing optical system with regard to suppressing stray coloured light, and because the size of the typically mechanical filter 14 is proportional to the wavelength for which it is calculated, $\lambda_0$ must have the greatest wavelength value which occurs in the focussing optical system 11, 30, 31.

λ is the wavelength for which the intensity $I_{W2}$ is calculated.

4. An explicit representation of the intensity ratio K as a function of the Abbe number V is difficult. Based on FIGS. 1, 2, 3, however, an Abbe number V which minimises the intensity ratio K can be specified for a given focussing optical system 11, 30, 31. The easiest way of dimensioning the given focussing optical system 11, 30, 31 is to conduct a numeric calculation of the intensity ratio K for the shortest wavelength (blue) of the focussing optical system 11 and a number of longer wavelengths up to the longest one (red). All wavelengths between the extreme wavelengths of blue and red have a K value which lies between the extrema of a range of V values, and the Abbe number which minimises the intensity ratio K is then selected for dimensioning the focussing optical system 11, 30, 31.

If the light modulator 4 and/or the focussing optical system 11, 30, 31 is replaced, the Abbe number V must always be recalculated.

The calculation of the cardinal elements of the refractive focussing optical system shall now be explained with the help of two examples with different Abbe numbers V.

a) The following parameters are given for the first doublet lens 30 of the focussing optical system according to FIG. 4a:

Abbe number V of the second component (lens 21): 5, as shown in FIG. 4a, FIG. 5a,
Initial face: F1
Final face: F5
Wavelength: yellow with 587.562 nm as the reference wavelength
Orientation: Y-Z
Unit of measurement for the lenses: millimetre
The object space positions are measured in relation to a first face (plane) F1.
The image space positions are measured in relation to a fifth face F5.

|  | Object space | Image space |
|---|---|---|
| Focal lengths | −7.124 | 7.124 |
| Focal planes | −6.966 | 0.029 |
| Principal planes | 0.158 | −7.094 |
| Anti-principal planes | −14.091 | 7.154 |
| Nodal planes | 0.158 | −7.094 |
| Anti-nodal planes | −14.091 | 7.154 | b) The following parameters are given for the second doublet lens 31 of the focussing optical system according to FIG. 4b:

Abbe number V of the second component (lens 23): 36.6, as shown in FIG. 4b, FIG. 5b,
Initial face: F1
Final face: F5
Wavelength: yellow 587.562 nm as the reference wavelength Orientation: Y-Z
Unit of measurement for the lenses: millimetre
The object space positions are measured in relation to a first face (plane) F1.
The image space positions are measured in relation to a fifth face F5.

|  | Object space | Image space |
|---|---|---|
| Focal lengths | −7.124 | 7.124 |
| Focal planes | −6.966 | 0.029 |
| Principal planes | 0.158 | −7.094 |
| Anti-principal planes | −14.091 | 7.154 |
| Nodal planes | 0.158 | −7.094 |
| Anti-nodal planes | −14.091 | 7.154 |

The design of the focussing optical systems 30, 31 is a possible design for a focal length of 7.12 mm (at 588 nm), based on the doublet lens 20, 21 and 22, 23. The only difference between the two options shown in FIGS. 4a, 5a and FIGS. 4b, 5b is the Abbe number V2 of the second lens; in one case the Abbe number V2 is 5, and in the other case it is 36.6.

It can be seen in the Tables and in the optical paths indicated in FIGS. 4a and 4b that the geometric parameters of the two focussing optical systems are identical.

The spot diagrams in FIGS. 5a and 5b at extra-axial imaging and collimated illumination for the three wavelengths of red, green and blue are calculated for a field angle α of 2°, where the spot diagrams 12, 13 are enlarged to the same degree, which means that in reality the spot diagram 13 in FIG. 5b is somewhat smaller than the spot diagram 12 in FIG. 5a.

It can be concluded that for the two focusing optical systems 30 and 31, which exhibit the same focal lengths, $f_O$ and $f_B$, and, more generally, the same geometric parameters for a given reference wavelength, and which, because of the different Abbe number V of the second component of the doublet lens, have two different variants 12, 13 of the spot diagrams for given wavelengths, where the adequate selection of the glass material is the crucial factor when it comes to minimising the total dispersion.

The ratio of the distances of the green and blue centre to the diameter of the blue spot diagram is
- in the light spot diagram 12: 31% for the focusing optical system 30 with the Abbe number of 5 of the second lens component—lens 21—and the green spot diagram 402 and the blue spot diagram 403 are formed separately.
- in the light spot diagram 13: 12% for the focusing optical system 31 with the Abbe number of 36.6 of the second lens component—lens 23—so that the three spot diagrams of red, green and blue, 411, 412 and 413, respectively, overlap in a substantially concentric manner.

This demonstrates that in the above-described device 1 and in the above-described manner by way of purposefully chromatising the optical imaging systems 11, 30, 31, which follow the light modulator 4, a substantial correction of the wavelength dependence of diffraction-based systems with light modulators can be achieved.

LIST OF REFERENCE NUMERALS

1 Device
2 Structure
3 Structure
4 Light modulator
5 Light source
6 Light pencil
7 Diffraction order, red
8 Diffraction order, blue
9 Surface normal
10 Filtering plane
11 Refractive focussing optical system
12 Polychromatic spot diagram
13 Polychromatic spot diagram
14 Filter
15 Filter
20 Lens
21 Lens
22 Lens
23 Lens
24 Incident white light beam
30 Doublet lens
31 Doublet lens
40 Device
401 Monochromatic spot diagram
402 Monochromatic spot diagram
403 Monochromatic spot diagram
411 Monochromatic spot diagram
412 Monochromatic spot diagram
413 Monochromatic spot diagram
50 Device
111 Chromatic focussing optical system
112 Chromatic focussing optical system
V Abbe number
V1 Abbe number of a first lens
V2 Abbe number of a second lens
$n_d$ Refractive index
$n_F$ Refractive index
$n_C$ Refractive index
$BO_R$ Diffraction order
$BO_G$ Diffraction order
$BO_B$ Diffraction order
$LQ_R$ Colour light source
$LQ_G$ Colour light source
$LQ_B$ Colour light source
$f_{\lambda B}$ Focal length for the blue wavelength $\lambda_B$
$f_{\lambda R}$ Focal length for the red wavelength $\lambda_R$
$f_{\lambda 0}$ Reference focal length for the reference wavelength $\lambda_0$
D Offset
OB Object-side focal plane
OH Object-side principal plane
F1 First face
F5 Fifth face
BB Image-side focal plane
BH Image-side principal plane
$f_O$ Object-side focal length for the reference wavelength
$f_B$ Image-side focal length for the reference wavelength
α Angle of incidence
α1 Diffraction angle
α2 Diffraction angle
h Height
d Distance

The invention claimed is:

1. Device for correcting the wavelength dependence in diffraction-based optical systems, in which a filtering of certain diffraction orders is provided, said device comprising:
at least one diffractive optical light modulator having controllable structures;
at least one light source for illuminating the light modulator; and
a refractive focussing optical system;

where corresponding wavelength-dependent diffraction orders are generated which exhibit a wavelength-dependent lateral chromatic offset, related to the surface normal of the light modulator, of the position of their different extents in a filtering plane which is defined by the focal length of a subsequent optical system, wherein the diffractive light modulator is followed by the refractive focussing optical system whose chromatic properties regarding the wavelength-dependent diffraction orders of the same ordinal number are adapted to the chromatic diffraction of the same diffraction orders of the same ordinal number of the light modulator, where in a given filtering plane behind the refractive focussing optical system the diffraction orders of the same ordinal number and of different wavelengths (red, green, blue) overlap as concentrically as possible.

2. Device according to claim 1, wherein the amount of the refractive dispersion of the focussing optical system is identical to the amount of the diffractive dispersion of the light modulator, where refractive dispersion and diffractive dispersion act in opposing directions, thus widely compensating each other.

3. Device according to claim 1, wherein in the filtering plane there is disposed a filtering aperture which only lets pass diffraction orders of the same ordinal number and of different wavelengths (red, green, blue).

4. Device according to claim 1, wherein the focussing optical system comprises at least two lenses.

5. Device according to claim 4, wherein the refractive indices of at least one lens of the focussing optical system for the wavelengths of red, green, blue are formed in dependence on the Abbe number V according to the equation $$V = (n_d - 1)/(n_F - n_C)$$

and that the diffraction patterns of the wavelengths of red, green, blue of the diffraction orders of the same ordinal number for the refractive index of the yellow wavelength overlap concentrically in the filtering plane.

6. Device according to claim 4, wherein the lenses of the refractive focussing optical system, form a doublet lens, where one lens exhibits a given Abbe number V1 and the other lens exhibits an Abbe number V2 which is adapted to the Abbe number V1 of the former lens.

7. Device according to claim 6, wherein the doublet lens with like geometric parameters is a doublet lens which comprises two plano-convex lenses which are disposed such that their plane faces are parallel and facing each other.

8. Device according to claim 4, wherein the refractive indices of the Abbe number V2 of the second lens of the doublet lens are determined based on a given value of the Abbe number V1 of the first lens for a largely concentric overlapping of the diffraction patterns of the corresponding wavelengths of red, green and blue in the filtering plane.

9. Device according to claim 5, wherein it is possible to determine the glass material or the glass materials of the given lens of the focussing optical system based on the given and determined Abbe numbers V and the corresponding refractive indices.

10. Device according to claim 1, wherein the light source is a single white light source, which comprises the three wavelengths of red, green and blue.

11. Device according to claim 1, wherein the light source is a light source unit with light sources of the individual colours with the wavelengths of blue, green, red, which are disposed at the same position or at various positions in a plane which is arranged at a right angle to the surface normal.

12. Device according to claim 1, wherein the light modulator comprises an optically active layer, in the form of a plane birefringent layer, which contains liquid crystals whose refractive index ellipsoid is controllable by way of applying an electric field to the structures in the form of pixels.

13. Device according to claim 1, wherein the light modulator comprises controllable electromechanical structures with diffractive optical properties.

14. Device according to claim 1, wherein the light modulator is an acousto-optic modulator.

15. Device according to claim 5, wherein the lenses of the refractive focussing optical system form a doublet lens, where one lens exhibits a given Abbe number V1 and the other lens exhibits an Abbe number V2 which is adapted to the Abbe number V1 of the former lens.

16. Device according to claim 15, wherein the doublet lens with like geometric parameters is a doublet lens which comprises two plano-convex lenses which are disposed such that their plane faces are parallel and facing each other.

* * * * *